United States Patent
Park et al.

(10) Patent No.: US 12,404,355 B2
(45) Date of Patent: Sep. 2, 2025

(54) PHOTOPOLYMERIZABLE COMPOSITION AND CURED FILM AND DISPLAY DEVICE USING THE SAME

(71) Applicant: DONGJIN SEMICHEM CO., LTD., Incheon (KR)

(72) Inventors: Jonghyuk Park, Gyeonggi-do (KR); Hyoc-Min Youn, Gyeonggi-do (KR); Tai Hoon Yeo, Gyeonggi-do (KR); Sang-Hoon Lee, Gyeonggi-do (KR); Wooram Oh, Gyeonggi-do (KR); Jongwook Lee, Gyeonggi-do (KR)

(73) Assignee: DONGJIN SEMICHEM CO., LTD., Incheon (KR)

( * ) Notice: Subject to any disclaimer, the term of this patent is extended or adjusted under 35 U.S.C. 154(b) by 806 days.

(21) Appl. No.: 17/540,824

(22) Filed: Dec. 2, 2021

(65) Prior Publication Data

US 2022/0098334 A1 Mar. 31, 2022

Related U.S. Application Data

(63) Continuation of application No. PCT/KR2020/007089, filed on Jun. 1, 2020.

(30) Foreign Application Priority Data

Jun. 4, 2019 (KR) .................. 10-2019-0065925

(51) Int. Cl.
*C08F 20/14* (2006.01)
*C08K 3/22* (2006.01)

(52) U.S. Cl.
CPC ............... *C08F 20/14* (2013.01); *C08K 3/22* (2013.01); *C08K 2003/2213* (2013.01); *C08K 2003/2241* (2013.01); *C08K 2003/2244* (2013.01); *C08K 2003/2296* (2013.01)

(58) Field of Classification Search
None
See application file for complete search history.

(56) References Cited

U.S. PATENT DOCUMENTS

| | | | | |
|---|---|---|---|---|
| 5,489,621 A * | 2/1996 | Sato | ........................ | G03F 1/56 430/293 |
| 7,615,581 B2 * | 11/2009 | Choi | ........................ | H01J 11/12 524/401 |
| 7,923,480 B2 * | 4/2011 | Fujita | ................... | C08F 220/287 522/74 |
| 7,943,206 B2 * | 5/2011 | Jones | ........................ | G02B 1/04 522/74 |
| 8,007,878 B2 * | 8/2011 | Yoneyama | .............. | G02B 1/111 264/1.32 |
| 8,241,755 B2 * | 8/2012 | Jones | ...................... | B82Y 30/00 523/202 |
| 8,349,934 B2 * | 1/2013 | Murofushi | ............ | C08F 292/00 524/424 |
| 8,586,154 B2 * | 11/2013 | Hunt | ........................ | G02B 1/04 349/95 |
| 9,880,322 B2 * | 1/2018 | Hunt | ........................ | G02B 1/04 |
| 10,559,777 B2 * | 2/2020 | Galand | ................... | H10K 71/00 |
| 2008/0161444 A1 * | 7/2008 | Hayashi | ................. | C08K 5/005 522/83 |
| 2010/0009287 A1 | 1/2010 | Kodama | | |
| 2011/0227008 A1 * | 9/2011 | Jones | ........................ | C09C 3/10 252/585 |
| 2014/0205771 A1 * | 7/2014 | Huang | ................. | C09D 143/04 522/71 |

FOREIGN PATENT DOCUMENTS

| | | |
|---|---|---|
| CN | 106459316 A | 2/2017 |
| JP | 2010-189506 A | 9/2010 |
| JP | 2013-237834 A | 11/2013 |
| JP | 2015-524494 A | 8/2015 |
| JP | 2017-082054 A | 5/2017 |
| JP | 2017-095556 A | 6/2017 |
| JP | 2018-080322 A | 5/2018 |
| KR | 0-2008-0005875 A | 1/2008 |
| KR | 10-2010-0007737 A | 1/2010 |
| KR | 10-2010-0069205 A | 6/2010 |
| KR | 10-2012-0040834 A | 4/2012 |
| KR | 10-2016-0141022 A | 12/2016 |
| KR | 10-1923209 B | 11/2018 |

* cited by examiner

*Primary Examiner* — Sanza L. McClendon
(74) *Attorney, Agent, or Firm* — United One Law Group LLC; Kongsik Kim; Jhongwoo Peck

(57) ABSTRACT

The present disclosure relates to a photopolymerizable composition capable of improving UV transmittance while maintaining excellent performance such as dielectric constant and sensitivity of a display device, and a cured film and a display device using the same.

20 Claims, No Drawings

PHOTOPOLYMERIZABLE COMPOSITION AND CURED FILM AND DISPLAY DEVICE USING THE SAME

CROSS-REFERENCE TO RELATED APPLICATIONS

The present application is a continuation application of International Application No. PCT/KR2020/007089 filed on Jun. 1, 2020, which claims priority to Korean Application No. 10-2019-0065925 filed on Jun. 4, 2019. The aforementioned applications are incorporated herein by reference.

TECHNICAL FIELD

The present disclosure relates to a photopolymerizable composition that has excellent refractive index, haze and viscosity properties and thus can be applied to a display device pattern, and a cured film and a display device using the same.

BACKGROUND ART

In the case of a transmissive optical film having a structured prism, the luminance increase rate changes depending on the refractive index of the resin constituting the prism structure. Generally, as the refractive index of the resin constituting the prism increases, the luminance increase rate increases. Therefore, research and development have been advanced in the direction of increasing the refractive index of the resin.

Generally, the resin constituting the prism is composed of organic compounds, and the upper limit of the refractive index range that can be adjusted with organic compounds is known to be about 1.7 in theory. Thus, the adjustable refractive index range is narrow compared to inorganic compounds. Further, high refractive resin composed of only organic compounds has problems such as an increase in viscosity and low UV stability, and thus is subject to many restrictions.

Further, the photopolymerizable composition conventionally used in the production of a general optical film uses a single olefinic monomer having high or low refractive index. However, although the refractive index and viscosity properties are improved, there is a limit to the improvement of ultraviolet transmittance or visibility.

SUMMARY

It is one object of the present disclosure to provide a photopolymerizable composition not only having a high refractive index and exhibiting viscosity properties suitable for producing a cured film, but also improving haze properties to improve ultraviolet transmission properties and visibility.

According to one embodiment of the present disclosure, there is provided a photopolymerizable composition comprising: one or more olefinic monomers; metal oxide particles; a dispersant; and a photopolymerization initiator, wherein the olefinic monomer comprises one or more olefinic monomers having an absolute viscosity (measured at 25° C.) of 1 cP to 30 cP.

According to another embodiment of the present disclosure, there is provided a cured film comprising a cured product of the photopolymerizable composition.

According to yet another embodiment of the present disclosure, there is provided a display device comprising a cured film as at least one or more of an optical film or a pattern film.

The present disclosure is effective in providing a photopolymerizable composition which is excellent in refractive index, haze, and viscosity performance as compared with a conventional case, which can contribute to performance improvement when applied to a display device, and a cured product-containing optical film using the same. Therefore, the display device including the optical film provides the effect of improving the refractive index and UV transmittance as compared with a conventional case.

DETAILED DESCRIPTION

Hereinafter, embodiments of the present disclosure will be described in detail. It will be understood that words or terms used in the specification and the appended claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The term "including" or "comprising" as used herein specifies a specific feature, region, integer, step, action, element and/or component, but does not exclude the presence or addition of a different specific feature, region, integer, step, action, element, and/or component.

The (meth)acrylate as used herein means including both acrylate and methacrylate.

Below, various embodiments of the present disclosure will be described in detail so that those skilled in the art can easily implement them. The embodiments can be modified in various different ways, and is not limited to the specific embodiments set forth herein.

According to one embodiment of the present disclosure, there can be provided a photopolymerizable composition comprising: one or more olefinic monomers; metal oxide particles; a dispersant; and a photopolymerization initiator, wherein the olefinic monomer comprises one or more olefinic monomers having an absolute viscosity (measured at 25° C.) of 1 cP to 30 cP.

The present disclosure relates to a photopolymerizable composition that improves refractive index, haze, and viscosity performance by using one or more olefinic monomers having low viscosity to high viscosity in a specific range as compared with a conventional case, and thus can be used in various fields such as an optical film or a pattern film of a display device, and to an optical film using the same.

Further, according to the present disclosure, an olefinic monomer having a specific range of low viscosity or high viscosity is selected among the above olefins according to the viscosity and refractive index, and then two or more types can be mixed and blended for use. For example, the present disclosure can provide a photopolymerizable composition having improved viscosity as well as haze properties compared to the conventional case by mixing and using two types of olefinic monomers whose viscosity (absolute viscosity) ranges having low viscosity and high viscosity are different. Further, since the photopolymerizable composition is processed without a solvent, workability due to the use of a solvent can be improved.

Specifically, each component used in the photopolymerizable composition will be described below.

The photopolymerizable composition includes one or more olefinic monomers with low viscosity to high viscosity having a specific range.

The olefinic monomer may include at least one olefinic monomer having an absolute viscosity (measured at 25° C.) of 1 cP to 30 cP.

Specifically, the olefinic monomer may include at least one olefinic monomer having an absolute viscosity of 2 cP to 25 cP measured under the same conditions as above. In this case, it is more effective to adjust the viscosity of the photopolymerizable composition to the range of 5 to 30 cP. Therefore, the present disclosure can provide an optical film or a pattern film having improved sensitivity, refractive index, transmittance, haze, viscosity, inkjet characteristics, and heat resistance.

When the absolute viscosity of the olefinic monomer is 1 cP or less, it may cause a decrease in heat resistance of the photopolymerizable composition, which may dry the inkjet nozzle and cause a discharge failure. Further, when the absolute viscosity of the olefinic monomer is 30 cP or more, the viscosity of the photopolymerizable composition may increase and thus may not be discharged from the inkjet or may cause a decrease in the discharge amount, which may cause a problem that it is difficult to form a coating film or a pattern.

Further, the olefinic monomer may include an olefinic monomer having an absolute viscosity (measured at 25° C.) of 1 cP or more and 11 cP or less.

The olefinic monomer may include an olefinic monomer having an absolute viscosity (measured at 25° C.) of more than 11 cP and 30 cP.

Specifically, the olefinic monomer may include a mono(meth)acrylate monomer having an absolute viscosity (measured at 25° C.) of 1 cP or more and 11 cP or less. The mono(meth)acrylate monomer may include an aliphatic mono(meth)acrylate having 6 to 20 carbon atoms, or 10 to 20 carbon atoms, or an aromatic mono(meth)acrylate having 8 to 30 carbon atoms, or 11 to 20 carbon atoms. The aliphatic mono(meth)acrylate may include a chain structure, a ring structure, or both.

The aliphatic mono(meth)acrylate having 6 to 20 carbon atoms, or 10 to 20 carbon atoms may include at least one selected from the group consisting of isodecyl (meth)acrylate, isobornyl(meth)acrylate, lauryl(meth)acrylate, ethoxy ethyl(meth)acrylate, dicyclopentenyl(meth)acrylate, dicyclopentenyl oxyethyl(meth)acrylate, and dicyclopentanyl (meth)acrylate.

The aromatic mono(meth)acrylate having 8 to 30 carbon atoms, or 11 to 20 carbon atoms may include at least one selected from the group consisting of benzyl (meth)acrylate, phenoxy ethyl(meth)acrylate, and phenoxy benzyl(meth)acrylate.

Further, the olefinic monomer may include a glycol di(meth)acrylate monomer having an absolute viscosity (measured at 25° C.) of more than 11 cP and 30 cP. The glycol di(meth)acrylate monomer may include at least one selected from the group consisting of 1,6-hexanediol di(meth)acrylate, triethylene glycol di(meth)acrylate, tetraethylene glycol di(meth)acrylate, dipropylene glycol di(meth)acrylate, and tripropylene glycol di(meth)acrylate.

In particular, according to one embodiment of the present disclosure, the olefinic monomer may include at least one selected from the group consisting of a low-viscosity first olefinic monomer having an absolute viscosity (measured at 25° C.) of 1 cP to 5 cP, and a high-viscosity second olefinic monomer having an absolute viscosity (measured at 25° C.) of 8 cP or more to 30 cP.

Further, the olefinic monomer may include a low-viscosity first olefinic monomer and a high-viscosity second olefinic monomer. In such a case, the second olefinic monomer may include a high-viscosity olefinic monomer having an absolute viscosity (measured at 25° C.) of 8 cP to 30 cP.

In this case, when the absolute viscosity of the first olefinic monomer is 2 cP to 5 cP or less, it can exhibit more excellent effects when mixed with the second monomer.

When the absolute viscosity of the second olefinic monomer is 8 cP to 25 cP or 8 cP to 15 cP, it can exhibit better effects when blended with the first monomer.

At this time, the viscosity of the first and second olefinic monomers specified in the present disclosure means the absolute viscosity value measured at 25° C. Further, the absolute viscosity can be measured using a viscometer well known in the art, and for example, a Brookfield viscometer may be used.

Meanwhile, in the photopolymerizable composition, when the olefinic monomer is a mixture containing a low-viscosity first olefinic monomer and a high-viscosity second olefinic monomer, it is preferable to adjust the mixing ratio before use. According to one embodiment, the content of the low-viscosity first olefin monomer can be 10 parts by weight to 80 parts by weight with respect to 100 parts by weight of the high-viscosity second olefin monomer. Further, the content of the low-viscosity olefinic monomer may be 20 parts by weight to 70 parts by weight with respect to 100 parts by weight of the high-viscosity olefinic monomer. In this case, the ratio of the above two components is optimized and a synergistic effect is exhibited, which can contribute to the improvement of the physical properties of the cured film. Therefore, the present disclosure can further improve the sensitivity, refractive index, transmittance, haze, viscosity, inkjet characteristics and heat resistance of a cured film using a photopolymerizable composition.

Further, as the low-viscosity or high-viscosity first and second olefinic monomers used in the olefinic monomer mixture, it is preferable to use a photopolymerizable olefinic monomer that satisfies the above-mentioned absolute viscosity range.

For example, the low-viscosity first olefinic monomer may include at least one selected from the group consisting of benzyl (meth)acrylate, isodecyl (meth)acrylate, lauryl (meth)acrylate, ethoxyethyl (meth)acrylate, dicyclopentenyl (meth)acrylate, and dicyclopentanyl (meth)acrylate.

The high-viscosity second olefinic monomer may include at least one selected from the group consisting of dicyclopentenyl oxyethyl(meth)acrylate, phenoxy ethyl(meth)acrylate, phenoxy benzyl(meth)acrylate, isobornyl (meth)acrylate, 1,6-hexanediol di(meth)acrylate, triethylene glycol di(meth)acrylate, tetraethylene glycol di(meth)acrylate, dipropylene glycol di(meth)acrylate, and tripropylene glycol di(meth)acrylate.

The content of the one or more olefinic monomers having the above-mentioned specific viscosity may be 5 parts by weight to 85% by weight based on 100% by weight of the total content of the photopolymerizable composition. When the content of the olefinic monomer mixture is 5 parts by weight or less, there is a problem that the uniformity of the metal oxide particles after forming the coating film is deteriorated, the viscosity is increased and thus inkjet discharge cannot be performed. When the content of the olefinic monomer mixture is 85 parts by weight or more, there is a problem that the refractive index is lowered to 1.6 or less.

Meanwhile, the metal oxide particles may include a metal element selected from the group consisting of Zn, Zr, Ti, Hf and Ce. Further, the particle size (D50) of the metal oxide particles may be 5 nm to 100 nm. When the particle size (D50) of the metal oxide particles becomes large to 100 nm or more, there is a disadvantage that light is scattered, transmittance is lowered and haze is increased. Further, when the particle size (D50) of the metal oxide particles is as small as 5 nm or less, the viscosity of the photopolymerizable composition increases and agglomeration of particles may occur more easily during storage, which causes problems that storage stability is lowered and the degree of dispersion is reduced. In this case, the particle size (D50) of the metal oxide particles may refer to the secondary particle size, that is, the particle size after the metal oxide particles are dispersed in the olefinic monomer.

The content of the metal oxide particles may be 10 parts by weight to 70 parts by weight based on 100 parts by weight of the total content of the photopolymerizable composition. If the content of the metal oxide is 10 parts by weight or less, there is a problem that the refractive index is lowered to 1.6 or less, and if the content of the metal oxide is 70 parts by weight or more, there is a problem that the uniformity of the metal oxide particles after forming the coating film is deteriorated, the viscosity becomes high and thus inkjet discharge cannot be performed.

The dispersant is included in the photopolymerizable composition and added in order to improve dispersion stability. Further, the type of the dispersant is not limited, and as an example, at least one selected from the group consisting of acryl-based, epoxy-based and silicone-based compounds can be used.

The content of the dispersant may be 0.1% by weight to 30% by weight based on 100% by weight of the total content of the photopolymerizable composition. If the content of the dispersant is 0.1% by weight or less, there is a problem that the metal oxide particles are not dispersed, and if the content of the dispersant is 30% by weight or more, there is a problem that the viscosity is increased and inkjet discharge cannot be performed.

The type of the photopolymerization initiator is not particularly limited as long as the photopolymerization is performed, and all the components well known in this field can be used. For example, as the photopolymerization initiator, at least one selected from the group consisting of triazine-based, benzoin-based, benzophenone-based, imidazole-based, xanthone-based, oxime ester-based and acetophenone-based compounds can be used. Examples of the photopolymerization initiator may include at least one selected from the group consisting of 2,4-bistrichloromethyl-6-p-methoxystyryl-s-triazine, 2-p-methoxystyryl-4,6-bistrichloromethyl-s-triazine, 2,4-trichloromethyl-6-triazine, 2,4-trichloromethyl-4-methylnaphthyl-6-triazine, 2-(o-chlorophenyl)-4,5-diphenyl imidazole dimer, 2-(o-chlorophenyl)-4,5-di(m-methoxyphenyl)imidazole dimer, 2-(o-fluorophenyl)-4,5-diphenyl imidazole dimer, 2-(o-methoxyphenyl)-4,5-diphenyl imidazole dimer, 2-(o-methoxyphenyl)-4,5-diphenyl imidazole dimer, 2,4-di(p-methoxy phenyl)-5-phenyl imidazole dimer, dimethoxyphenyl)-4,5-diphenyl imidazole dimer, 2-(p-methylmercaptophenyl)-4,5-diphenyl imidazole dimer, [1-[9-ethyl-6-(2-methylbenzoyl)-9H-carbazolyl-3-yl]-1-(O-acetyloxime), benzophenone, p-(diethylamino) benzophenone, 2,2-dichloro-4-phenoxyacetophenone, 2,2-diethoxyacetophenone, 2-dodecylthioxanthone, 2,4-dimethylthioxanthone, 2,4-diethylthioxanthone, 2,2-bis-2-chlorophenyl-4,5,4,5-tetraphenyl-2-1,2-biimidazole, (E)-2-(acetoxyimino)-1-(9,9-diethyl-9H-fluorene-2-yl)butanone, (E)-1-(9,9-dibutyl-7-nitro-9H-fluorene-2-yl)ethanone O-acetyloxime, (Z)-2-(acetoxyimino)-1-(9,9-diethyl-9H-fluorene-2-yl)propanone, Irgacure 369, Irgacure 651, Irgacure 907, Darocur TPO, Irgacure 819, OXE-01, OXE-02, OXE-03, OXE-04 (available from BASF), N-1919, NCI-831 and NCI-930 (available from ADEKA).

The content of the photopolymerization initiator may be 0.1% by weight to 30% by weight, based on 100% by weight of the total content of the photopolymerizable composition. If the content of the photopolymerization initiator is 0.1% by weight or less, there is a problem that the coating film is not cured, and if the content of the photopolymerization initiator is 30% by weight or more, there is a problem that the integrated transmittance after forming the coating film is reduced to 90% or less.

Further, the absolute viscosity (measured at 25° C.) of the photopolymerizable composition may be 5 to 30 cP or 11 cP to 30 cP. The absolute viscosity can be measured using a viscometer well known in the art, and for example, a Brookfield viscometer can be used. As the composition of the present disclosure exhibits the above viscosity properties, excellent inkjet characteristics can be realized.

That is, in the inkjet characteristics, when the viscosity of the composition (product) is 5 cP or less which is too low, discharge properties may be deteriorated due to nozzle drying or clogging. Further, when the viscosity of the composition (product) is 30 cP or more which is too high, there is a problem that the discharge amount is reduced and a pattern and a surface are not formed. Further, when the viscosity of the composition (product) is near 10 cP, the inkjet discharge characteristics are the most excellent and thus, blending low viscosity and high viscosity is the most effective.

In addition, the photopolymerizable composition may further include other components. As a non-limiting example, when the photopolymerizable composition is applied, it may further include an additive capable of improving the uniformity of the film thickness or the surface smoothness, or improving adhesion between the photopolymerizable composition and the substrate. As such an additive, at least one selected from the group consisting of a surfactant, a silane-based coupling agent, and a crosslinking agent compound can be used.

For example, any one or more additives selected from the group consisting of 0.1 parts by weight to 30 parts by weight of a melamine crosslinking agent, or 0.1 parts by weight to 30 parts by weight of a silane coupling agent based on 100 parts by weight of the photopolymerizable composition can be further included.

Meanwhile, the present disclosure can provide a cured film including a cured product which is a cured coating layer thereof by using the photopolymerizable composition. Such a cured film may be used as an optical film or a pattern film of a display device. As a method for forming the coating layer, a method of implementing a single film (bar, applicator, inkjet) or pattern (inkjet) with a Mayer bar, a coating applicator, or inkjet device and exposing it using a metal halide lamp can be used.

Specifically, the cured product means a material in the form of a film having a predetermined thickness obtained through the curing step of the photopolymerizable composition of the above one embodiment. The details concerning the photopolymerizable composition includes the contents described above in the one embodiment.

The cured product may include an olefin resin crosslinked and formed by curing the olefinic monomer; and metal oxide particles dispersed in the olefin resin matrix. The olefin-based resin is a polymer obtained through a polymerization reaction of one or more olefinic monomers of the one embodiment, and specifically, it may include a first repeating unit derived from a low-viscosity olefinic monomer having an absolute viscosity (measured at 25° C.) of 2 cP to 5 cP, and a second repeating unit derived from a high-viscosity olefinic monomer having an absolute viscosity (measured at 25° C.) of 8 cP to 25 cP or 8 cP to 15 cP.

The olefin resin is a copolymer polymerized from one or more monomers, and the form of the copolymerization is not particularly limited. For example, the olefin resin may be variously implemented as a homo copolymer, a block copolymer, a random copolymer, a graft copolymer, and the like.

According to one embodiment of the present disclosure, a display device including a cured film as an optical film or a pattern film is provided.

When the cured film including the cured product is applied as an optical film of a display device, it may include the steps of coating the photopolymerizable composition onto the substrate with a Mayer bar, a coating applicator, or an inkjet device to form a single film, and exposing it using a metal halide lamp.

The thickness of the optical film, which is a cured film provided by the above method, is not greatly limited, but for example, it can be freely adjusted within the range of 0.01 μm to 1000 μm. When the thickness of the optical film increases or decreases by a specific value, the physical properties measured from the optical film may also change by a certain value.

As the substrate, a well-known substrate such as bare glass can be used.

Further, according to another embodiment of the present disclosure, when the cured film including the cured product is applied as a pattern film of a display device, a pattern film including a cured pattern and an opening of the photopolymerizable composition can be provided. The details concerning the photopolymerizable composition includes the content described above in the one embodiment.

The cured pattern of the photopolymerizable composition may be a pattern formed through exposure using an inkjet device.

The method of producing the pattern film may include the steps of coating a photopolymerizable composition onto a substrate with an inkjet device to form a pattern, and exposing it using a metal halide lamp. In addition, the substrate and the exposure method may be the same as the above-mentioned method for producing an optical film.

By such an exposure step, the cured film is provided as an optical film including a cured product of the photopolymerizable composition or a pattern film on which an inkjet pattern is formed, and can be applied to a display device.

Further, the optical film provided by the above method may have a refractive index of 1.6 or more, or 1.6 or more and 2.0 or less. The refractive index may mean a value measured at 555 to 575 nm (average) using an ellipsometer. In particular, the optical film may have a haze of 1.0 or less or 0.3 or less, or 0.01 or more and 0.3 or less.

Further, the optical film may have a sensitivity value of 3 J or less, and a transmittance of 90% or more. The sensitivity is measured by comparing absorbance measurement results before and after exposure using an FT-IR spectrophotometer. The conversion rate is obtained by integrating the C=O peak of 1650~1750 $cm^{-1}$ and the C=C peak of 780~880 $cm^{-1}$, and the sensitivity refers to the amount of exposure that saturates at a conversion rate of 80% or more. The transmittance may mean an average transmittance of the optical film measured at 380 to 780 nm using a UV-VIS spectrophotometer.

Further, the optical film can have a 5 wt. % loss temperature of 270° C. or more, which is measured by TGA by increasing the temperature from room temperature to 900° C. at a rate of 10° C. per minute, and thereby can exhibit excellent heat resistance.

Further, the above-mentioned parameter characteristic values can exhibit the same results in the pattern film.

Further, according to another embodiment of the present disclosure, a display device including a cured film as at least one of an optical film and a pattern film can be provided. The details concerning the optical film or the pattern film includes the content described above in the other embodiment.

Therefore, the display device employing the optical film or the pattern film can exhibit high refractive index and improve ultraviolet transmission characteristics as compared with the conventional case.

The configuration of the display device to which the optical film or the pattern film is applied may be performed by a method well known in the art, and the shape, size, and form of the optical film or the pattern film are not particularly limited.

Hereinafter, examples are presented to facilitate the understanding of the present disclosure. However, the following examples are for illustrative purposes only and the present disclosure is not limited thereto.

Comparative Examples 1 to 5 and Examples 1 to 51

The monomer compositions of Tables 1 and 2 below were used for the preparation of the photopolymerizable composition.

Then, respective components were mixed according to the compositions of Tables 3 and 4 to prepare the photopolymerizable compositions of Comparative Examples and Examples. For reference, the particle size (D50) in Tables 3 and 4 means the secondary particle size, that is, the particle size after the metal oxide particles are dispersed in the olefinic monomer.

Each photopolymerizable composition was put into the inkjet device, and then coated onto bare glass to form a single film so as to have a thickness of 20 μm.

Then, a single film was irradiated with an exposure amount of 1.5 $J/cm^2$ using a belt-type metal halide UV irradiation device (120 $W/cm^2$) to produce a coating film containing a cured product of the photopolymerizable composition. This coating film (thickness: 20 μm) was provided as an optical film.

Then, for the respective films of Comparative Examples and Examples, the physical properties such as refractive index, haze and viscosity were measured by the following method, and the results are shown in Tables 5 and 6 below.

1) Sensitivity

The absorbance was measured before and after exposure using an FT-IR spectrophotometer, and the measurement results were compared. The conversion rate was obtained by integrating the C=O peak of 650~1750 $cm^{-1}$ and the C=C peak of 780~880 $cm^{-1}$, and the sensitivity refers to the amount of exposure that saturates when the conversion rate is 80% or more.

Judgment

◯: when the sensitivity value is 3 J or less

X: when the sensitivity value is 3 J or more

2) Refractive Index

The refractive index (average 555~575 nm) of the bare glass on which the 201 μm coating film was formed was measured using an ellipsometer.

Judgment

○: when the measured refractive index of the coating film is 1.6 or more

X: when the measured refractive index of the coating film is 1.6 or less

3) Transmittance

The average transmittance of the formed coating film was measured at 380 to 780 nm using a UV-VIS spectrophotometer (Cary4000, Agilent).

Judgment

○: when the average transmittance value is 90% or more

X: when the average transmittance value is 90% or less

4) Haze

The haze was measured using a haze meter COH 400 produced by NIPPON DENSHOKU.

Judgment

○: when the haze measurement value is 1.0 or less

X: when the haze measurement value is 1.0 or more

5) Viscosity (Absolute Viscosity)

The viscosities of the photopolymerizable compositions or olefinic monomers of Comparative Examples and Examples were measured using a viscometer (trade name: Brook Field viscometer) at a temperature of 25° C.

Judgment

○: when the viscosity value is 5 to 30 cP

X: when the viscosity value is out of the above range

6) Inkjet Characteristics

It was confirmed whether the surface was formed by changing the nozzle temperature of the inkjet device.

Judgment

Surface formation at nozzle temperature 25~35° C.=⊚

Surface formation at nozzle temperature 35~50° C.=○

No surface formation at nozzle temperature 25~50° C.=X

7) Heat Resistance

Heat resistance was measured using TGA. The pattern film formed during the sensitivity measurement was sampled, and then the temperature was raised from room temperature to 900° C. at a rate of 10° C. per minute using TGA.

Judgment

○: TGA 5 wt % weight loss temp. 270° C. or higher x: TGA 5 wt % weight loss temp. 270° C. or lower

TABLE 1

| # | Benzyl acrylate (2 cP) | Lauryl acrylate (4 cP) | Isodecyl acrylate (5 cP) | Phenoxyethyl acrylate (9 cP) | Isobornyl acrylate (8 cP) | Phenoxybenzyl acrylate (10 cP) | Hexanediol diacrylate (12 cP) | Dipropylene glycol diacrylate (15 cP) | Triethylene glycol diacrylate (20 cP) | Tripropylene glycol diacrylate (25 cP) |
|---|---|---|---|---|---|---|---|---|---|---|
| 1 | 100 | | | | | | | | | |
| 2 | 100 | | | | | | | | | |
| 3 | 100 | | | | | | | | | |
| 4 | 100 | | | | | | | | | |
| 5 | 100 | | | | | | | | | |
| 6 | | | | 100 | | | | | | |
| 7 | | 100 | | | | | | | | |
| 8 | | | 100 | | | | | | | |
| 9 | | | | 100 | | | | | | |
| 10 | | | | | 100 | | | | | |
| 11 | | | | | | 100 | | | | |
| 12 | | | | | | | 100 | | | |
| 13 | | | 100 | | | | | | | |
| 14 | | | | | 100 | | | | | |
| 15 | | | | | | 100 | | | | |
| 16 | | | | | | | 100 | | | |
| 17 | | | | | | | | 100 | | |
| 18 | | | | | | | | | 100 | |
| 19 | | | | | | | | | | 100 |
| 20 | | 40 | 60 | | | | | | | |
| 21 | | 30 | 70 | | | | | | | |
| 22 | | 20 | 80 | | | | | | | |
| 23 | | 40 | 60 | | | | | | | |
| 24 | | 30 | 70 | | | | | | | |
| 25 | | 20 | 80 | | | | | | | |
| 26 | | 40 | 60 | | | | | | | |
| 27 | | 30 | 70 | | | | | | | |

TABLE 2

| # | Methyl acrylate (0.5 cP) | Benzyl acrylate (2cP) | Lauryl acrylate (4 cP) | Isodecyl acrylate (5 cP) | Phenoxyethyl acrylate (9 cP) | Isobornyl acrylate (8 cP) | Phenoxybenzyl acrylate (10 cP) | Hexanediol diacrylate (12 cP) | Biphenyl methyl acrylate (40 cP) |
|---|---|---|---|---|---|---|---|---|---|
| 28 | | | 20 | 80 | | | | | |
| 29 | | | 20 | 80 | | | | | |
| 30 | | 100 | | | | | | | |
| 31 | | | 20 | 80 | | | | | |

TABLE 2-continued

| | Monomer ratio | | | | | | | | |
|---|---|---|---|---|---|---|---|---|---|
| # | Methyl acrylate (0.5 cP) | Benzyl acrylate (2cP) | Lauryl acrylate (4 cP) | Isodecyl acrylate (5 cP) | Phenoxyethyl acrylate (9 cP) | Isobornyl acrylate (8 cP) | Phenoxybenzyl acrylate (10 cP) | Hexanediol diacrylate (12 cP) | Biphenyl methyl acrylate (40 cP) |
| 32 | | | 20 | | 80 | | | | |
| 33 | | | 20 | | 80 | | | | |
| 34 | | | 20 | | 80 | | | | |
| 35 | | 20 | | | 80 | | | | |
| 36 | | 20 | | | | 80 | | | |
| 37 | | 20 | | | | | 80 | | |
| 38 | | 20 | | | | | | 80 | |
| 39 | | | 20 | | | 80 | | | |
| 40 | | | 20 | | | | 80 | | |
| 41 | | | 20 | | | | | 80 | |
| 42 | | | | 20 | 80 | | | | |
| 43 | | | | 20 | | 80 | | | |
| 44 | | | | 20 | | | 80 | | |
| 45 | | | | 20 | | | | 80 | |
| 46 | | | 20 | | 80 | | | | |
| 47 | | | 20 | | 80 | | | | |
| 48 | | | 20 | | 80 | | | | |
| 49 | | | 20 | | 80 | | | | |
| 50 | | | 20 | | 80 | | | | |
| 51 | | | 20 | | 80 | | | | |
| 52 | 100 | | | | | | | | |
| 53 | | | | | | | | | 100 |
| 54 | 100 | | | | | | | | |
| 55 | 20 | | | | | | | | 80 |
| 56 | 80 | | | | | | | | 20 |

TABLE 3

| | Metal oxide | | | Monomer | | Photoinitiator (wt. %) A |
|---|---|---|---|---|---|---|
| Category | Type of particles | Particle size (D50) | Particle content (wt. %) | Dispersant (wt. %) | Content (wt. %) | Type |
| Example 1 | TiO$_2$ | 30 | 70.0 | 6.0 | 19.0 | 1 | 5 |
| Example 2 | TiO$_2$ | 30 | 60.0 | 6.0 | 29.0 | 2 | 5 |
| Example 3 | TiO$_2$ | 30 | 55.0 | 5.5 | 34.5 | 3 | 5 |
| Example 4 | TiO$_2$ | 30 | 50.0 | 5.0 | 40.0 | 4 | 5 |
| Example 5 | TiO$_2$ | 30 | 40.0 | 4.0 | 51.0 | 5 | 5 |
| Example 6 | TiO$_2$ | 30 | 10.0 | 1.0 | 84.0 | 6 | 5 |
| Example 7 | TiO$_2$ | 30 | 50.0 | 5.0 | 40.0 | 7 | 5 |
| Example 8 | TiO$_2$ | 30 | 50.0 | 5.0 | 40.0 | 8 | 5 |
| Example 9 | TiO$_2$ | 30 | 50.0 | 5.0 | 40.0 | 9 | 5 |
| Example 10 | TiO$_2$ | 30 | 50.0 | 5.0 | 40.0 | 10 | 5 |
| Example 11 | ZrO$_2$ | 30 | 50.0 | 5.0 | 40.0 | 11 | 5 |
| Example 12 | ZrO$_2$ | 30 | 50.0 | 5.0 | 40.0 | 12 | 5 |
| Example 13 | ZrO$_2$ | 15 | 40.0 | 4.0 | 51.0 | 13 | 5 |
| Example 14 | ZrO$_2$ | 15 | 40.0 | 4.0 | 51.0 | 14 | 5 |
| Example 15 | ZrO$_2$ | 15 | 40.0 | 4.0 | 51.0 | 15 | 5 |
| Example 16 | ZrO$_2$ | 15 | 40.0 | 4.0 | 51.0 | 16 | 5 |
| Example 17 | ZrO$_2$ | 15 | 40.0 | 4.0 | 51.0 | 17 | 5 |
| Example 18 | ZrO$_2$ | 15 | 40.0 | 4.0 | 51.0 | 18 | 5 |
| Example 19 | ZrO$_2$ | 15 | 40.0 | 4.0 | 51.0 | 19 | 5 |
| Example 20 | ZrO$_2$ | 30 | 50.0 | 5.0 | 40.0 | 20 | 5 |
| Example 21 | ZnO | 30 | 50.0 | 5.0 | 40.0 | 21 | 5 |
| Example 22 | ZnO | 30 | 50.0 | 5.0 | 40.0 | 22 | 5 |
| Example 23 | ZnO | 30 | 35.0 | 3.5 | 56.5 | 23 | 5 |
| Example 24 | ZnO | 30 | 35.0 | 3.5 | 56.5 | 24 | 5 |
| Example 25 | ZnO | 30 | 35.0 | 3.5 | 56.5 | 25 | 5 |
| Example 26 | ZnO | 30 | 35.0 | 3.5 | 46.5 | 26 | 15 |
| Example 27 | ZnO | 30 | 35.0 | 3.5 | 46.5 | 27 | 15 |
| Example 28 | ZnO | 30 | 35.0 | 3.5 | 46.5 | 28 | 15 |
| Example 29 | ZnO | 30 | 35.0 | 3.5 | 31.5 | 29 | 30 |
| Example 30 | ZnO | 30 | 60.0 | 6.0 | 33.0 | 30 | 1 |

Note)
Type of photoinitiator
A: [1-[9-ethyl-6-(2-methylbenzoyl)-9H-carbazolyl-3-yl]-1-(O-acetyloxime)

TABLE 4

| Category | Metal oxide Type of particles | Particle size (D50) | Particle content (wt. %) | Dispersant content (wt. %) | Monomer Content (wt. %) | Monomer Type | Photoinitiator (wt. %) A | B | C | D | E |
|---|---|---|---|---|---|---|---|---|---|---|---|
| Example 31 | HfO$_2$ | 45 | 50.0 | 5.0 | 40.0 | 31 | | 5 | | | |
| Example 32 | HfO$_2$ | 45 | 50.0 | 5.0 | 40.0 | 32 | | | 5 | | |
| Example 33 | HfO$_2$ | 45 | 50.0 | 5.0 | 40.0 | 33 | | | | 5 | |
| Example 34 | HfO$_2$ | 45 | 50.0 | 5.0 | 40.0 | 34 | | | | | 5 |
| Example 35 | HfO$_2$ | 30 | 50.0 | 5.0 | 40.0 | 35 | 5 | | | | |
| Example 36 | HfO$_2$ | 30 | 50.0 | 5.0 | 40.0 | 36 | 5 | | | | |
| Example 37 | HfO$_2$ | 30 | 50.0 | 5.0 | 40.0 | 37 | 5 | | | | |
| Example 38 | HfO$_2$ | 30 | 50.0 | 5.0 | 40.0 | 38 | 5 | | | | |
| Example 39 | HfO$_2$ | 80 | 50.0 | 5.0 | 40.0 | 39 | 5 | | | | |
| Example 40 | HfO$_2$ | 80 | 50.0 | 5.0 | 40.0 | 40 | 5 | | | | |
| Example 41 | CeO$_2$ | 80 | 50.0 | 5.0 | 40.0 | 41 | 5 | | | | |
| Example 42 | CeO$_2$ | 50 | 50.0 | 5.0 | 40.0 | 42 | 5 | | | | |
| Example 43 | CeO$_2$ | 50 | 50.0 | 5.0 | 40.0 | 43 | 5 | | | | |
| Example 44 | CeO$_2$ | 50 | 50.0 | 5.0 | 40.0 | 44 | 5 | | | | |
| Example 45 | CeO$_2$ | 50 | 50.0 | 5.0 | 40.0 | 45 | 5 | | | | |
| Example 46 | CeO$_2$ | 5 | 50.0 | 5.0 | 40.0 | 46 | 5 | | | | |
| Example 47 | CeO$_2$ | 7 | 50.0 | 5.0 | 40.0 | 47 | 5 | | | | |
| Example 48 | CeO$_2$ | 25 | 50.0 | 5.0 | 40.0 | 48 | 5 | | | | |
| Example 49 | CeO$_2$ | 50 | 50.0 | 5.0 | 40.0 | 49 | 5 | | | | |
| Example 50 | CeO$_2$ | 80 | 50.0 | 5.0 | 40.0 | 50 | 5 | | | | |
| Example 51 | CeO$_2$ | 100 | 50.0 | 5.0 | 40.0 | 51 | 5 | | | | |
| Comparative Example 1 | ZrO$_2$ | 30 | 50.0 | 5.0 | 40.0 | 52 | 5 | | | | |
| Comparative Example 2 | ZrO$_2$ | 30 | 50.0 | 5.0 | 40.0 | 53 | 5 | | | | |
| Comparative Example 3 | ZrO$_2$ | 30 | 40.0 | 4.0 | 51.0 | 54 | 5 | | | | |
| Comparative Example 4 | ZnO | 30 | 50.0 | 5.0 | 40.0 | 55 | 5 | | | | |
| Comparative Example 5 | HfO$_2$ | 30 | 50.0 | 5.0 | 40.0 | 56 | 5 | | | | |

Note)
Type of photoinitiator
A: [1-[9-ethyl-6-(2-methylbenzoyl)-9H-carbazolyl-3-yl]-1-(O-acetyloxime)
B: OXE-04
C: Darocure TPO
D: (E)-2-(acetoxyimino)-1-(9,9-diethyl-9H-fluoren-2-yl)butanone
E: Irgacure 819

TABLE 5

| Category | Sensitivity | Refractive index | Transmittance (%) | Haze (%) | Viscosity (cP) | Inkjet jetting characteristics | Heat resistance |
|---|---|---|---|---|---|---|---|
| Example 1 | ○ | ○ | ○ | ○ | ○ | ○ | ○ |
| Example 2 | ○ | ○ | ○ | ○ | ○ | ○ | ○ |
| Example 3 | ○ | ○ | ○ | ○ | ○ | ○ | ○ |
| Example 4 | ○ | ○ | ○ | ○ | ○ | ○ | ○ |

TABLE 5-continued

| Category | Sensitivity | Refractive index | Transmittance (%) | Haze (%) | Viscosity (cP) | Inkjet jetting characteristics | Heat resistance |
| --- | --- | --- | --- | --- | --- | --- | --- |
| Example 5 | ○ | ○ | ○ | ○ | ○ | ○ | ○ |
| Example 6 | ○ | ○ | ○ | ○ | ○ | ○ | ○ |
| Example 7 | ○ | ○ | ○ | ○ | ○ | ○ | ○ |
| Example 8 | ○ | ○ | ○ | ○ | ○ | ○ | ○ |
| Example 9 | ○ | ○ | ○ | ○ | ○ | ○ | ○ |
| Example 10 | ○ | ○ | ○ | ○ | ○ | ○ | ○ |
| Example 11 | ○ | ○ | ○ | ○ | ○ | ○ | ○ |
| Example 12 | ○ | ○ | ○ | ○ | ○ | ○ | ○ |
| Example 13 | ○ | ○ | ○ | ○ | ○ | ○ | ○ |
| Example 14 | ○ | ○ | ○ | ○ | ○ | ○ | ○ |
| Example 15 | ○ | ○ | ○ | ○ | ○ | ○ | ○ |
| Example 16 | ○ | ○ | ○ | ○ | ○ | ○ | ○ |
| Example 17 | ○ | ○ | ○ | ○ | ○ | ○ | ○ |
| Example 18 | ○ | ○ | ○ | ○ | ○ | ○ | ○ |
| Example 19 | ○ | ○ | ○ | ○ | ○ | ○ | ○ |
| Example 20 | ○ | ○ | ○ | ○ | ○ | ◎ | ○ |
| Example 21 | ○ | ○ | ○ | ○ | ○ | ◎ | ○ |
| Example 22 | ○ | ○ | ○ | ○ | ○ | ◎ | ○ |
| Example 23 | ○ | ○ | ○ | ○ | ○ | ◎ | ○ |
| Example 24 | ○ | ○ | ○ | ○ | ○ | ◎ | ○ |
| Example 25 | ○ | ○ | ○ | ○ | ○ | ◎ | ○ |
| Example 26 | ○ | ○ | ○ | ○ | ○ | ◎ | ○ |
| Example 27 | ○ | ○ | ○ | ○ | ○ | ◎ | ○ |
| Example 28 | ○ | ○ | ○ | ○ | ○ | ◎ | ○ |
| Example 29 | ○ | ○ | ○ | ○ | ○ | ◎ | ○ |
| Example 30 | ○ | ○ | ○ | ○ | ○ | ○ | ○ |

TABLE 6

| Category | Sensitivity | Refractive index | Transmittance (%) | Haze (%) | Viscosity (cP) | Inkjet jetting characteristics | Heat resistance |
| --- | --- | --- | --- | --- | --- | --- | --- |
| Example 31 | ○ | ○ | ○ | ○ | ○ | ◎ | ○ |
| Example 32 | ○ | ○ | ○ | ○ | ○ | ◎ | ○ |
| Example 33 | ○ | ○ | ○ | ○ | ○ | ◎ | ○ |
| Example 34 | ○ | ○ | ○ | ○ | ○ | ◎ | ○ |
| Example 35 | ○ | ○ | ○ | ○ | ○ | ◎ | ○ |
| Example 36 | ○ | ○ | ○ | ○ | ○ | ◎ | ○ |
| Example 37 | ○ | ○ | ○ | ○ | ○ | ◎ | ○ |
| Example 38 | ○ | ○ | ○ | ○ | ○ | ◎ | ○ |
| Example 39 | ○ | ○ | ○ | ○ | ○ | ◎ | ○ |

TABLE 6-continued

| Category | Sensitivity | Refractive index | Transmittance (%) | Haze (%) | Viscosity (cP) | Inkjet jetting characteristics | Heat resistance |
|---|---|---|---|---|---|---|---|
| Example 40 | ○ | ○ | ○ | ○ | ○ | ◎ | ○ |
| Example 41 | ○ | ○ | ○ | ○ | ○ | ◎ | ○ |
| Example 42 | ○ | ○ | ○ | ○ | ○ | ◎ | ○ |
| Example 43 | ○ | ○ | ○ | ○ | ○ | ◎ | ○ |
| Example 44 | ○ | ○ | ○ | ○ | ○ | ◎ | ○ |
| Example 45 | ○ | ○ | ○ | ○ | ○ | ◎ | ○ |
| Example 46 | ○ | ○ | ○ | ○ | ○ | ◎ | ○ |
| Example 47 | ○ | ○ | ○ | ○ | ○ | ◎ | ○ |
| Example 48 | ○ | ○ | ○ | ○ | ○ | ◎ | ○ |
| Example 49 | ○ | ○ | ○ | ○ | ○ | ◎ | ○ |
| Example 50 | ○ | ○ | ○ | ○ | ○ | ◎ | ○ |
| Example 51 | ○ | ○ | ○ | ○ | ○ | ◎ | ○ |
| Comparative Example 1 | ○ | ○ | ○ | ○ | X | X | X |
| Comparative Example 2 | ○ | ○ | ○ | ○ | X | X | ○ |
| Comparative Example 3 | ○ | ○ | ○ | ○ | X | X | X |
| Comparative Example 4 | ○ | ○ | ○ | ○ | X | X | ○ |
| Comparative Example 5 | ○ | ○ | ○ | ○ | X | X | X |

Looking at the results of Tables 5 and 6 above, Examples 1 to 51 of the present disclosure exhibit a haze of 1% or less while having good refractive index and viscosity, as compared with Comparative Examples 1 to 5. Further, Examples have excellent inkjet characteristics as well as sensitivity, transmittance and heat resistance, as compared with Comparative Examples. Thus, when the cured film is applied as at least one of an optical film and a pattern film in a display device, it can contribute to performance improvement.

The invention claimed is:

1. A photopolymerizable composition comprising:
one or more olefinic monomers;
metal oxide particles;
a dispersant; and
a photopolymerization initiator,
wherein the olefinic monomer comprises one or more olefinic monomers having an absolute viscosity measured at 25° C. of 1 cP to 30 cP,
wherein the olefinic monomer comprises a mono(meth)acrylate monomer having an absolute viscosity measured at 25° C. of 1 cP or more and 11 cP or less,
wherein the mono(meth)acrylate monomer comprises an aliphatic mono(meth)acrylate having 6 to 20 carbon atoms, and
wherein the aliphatic mono(meth)acrylate comprises at least one selected from the group consisting of isodecyl (meth)acrylate, isobornyl (meth)acrylate, lauryl (meth)acrylate, ethoxy ethyl(meth)acrylate, dicyclopentenyl (meth)acrylate, dicyclopentenyl oxyethyl(meth)acrylate, and dicyclopentanyl(meth)acrylate.

2. The photopolymerizable composition of claim 1, wherein the olefinic monomer further comprises a glycol di(meth)acrylate monomer having an absolute viscosity measured at 25° C. of 11 cP to 30 cP.

3. The photopolymerizable composition of claim 1, wherein the mono(meth)acrylate monomer further comprises an aromatic mono(meth)acrylate having 8 to 30 carbon atoms.

4. The photopolymerizable composition of claim 3, wherein the aromatic mono(meth)acrylate having 8 to 30 carbon atoms comprises at least one selected from the group consisting of benzyl (meth)acrylate, phenoxy ethyl(meth) acrylate, and phenoxy benzyl(meth)acrylate.

5. The photopolymerizable composition of claim 2, wherein the glycol di(meth)acrylate monomer comprises at least one selected from the group consisting of 1,6-hexanediol di(meth)acrylate, triethylene glycol di(meth)acrylate, tetraethylene glycol di(meth)acrylate, dipropylene glycol di(meth)acrylate, and tripropylene glycol di(meth)acrylate.

6. The photopolymerizable composition of claim 1, wherein the olefinic monomer further comprises at least one selected from the group consisting of a low-viscosity first olefinic monomer having an absolute viscosity measured at 25° C. of 1 cP to 5 cP, and a high-viscosity second olefinic monomer having an absolute viscosity measured at 25° C. of 8 cP to 30 cP.

7. The photopolymerizable composition of claim 6, wherein the olefinic monomer comprises the low-viscosity first olefinic monomer and the high-viscosity second olefinic monomer.

8. The photopolymerizable composition of claim 6, wherein content of the low-viscosity first olefinic monomer is 10 parts by weight to 80 parts by weight relative to 100 parts by weight of the high-viscosity second olefinic monomer.

9. The photopolymerizable composition of claim 6, wherein the second olefinic monomer comprises a high-viscosity olefinic monomer having an absolute viscosity measured at 25° C. of 8 cP to 15 cP.

10. The photopolymerizable composition of claim 6, wherein the low-viscosity first olefinic monomer comprises at least one selected from the group consisting of benzyl (meth)acrylate, isodecyl (meth)acrylate, lauryl (meth)acrylate, ethoxyethyl (meth)acrylate, dicyclopentenyl (meth)acrylate, and dicyclopentanyl (meth)acrylate.

11. The photopolymerizable composition of claim 6, wherein the high-viscosity second olefinic monomer comprises at least one selected from the group consisting of dicyclopentenyl oxyethyl (meth)acrylate, phenoxy ethyl (meth)acrylate, phenoxy benzyl(meth)acrylate, isobornyl (meth)acrylate, 1,6-hexanediol di(meth)acrylate, triethylene glycol di(meth)acrylate, tetraethylene glycol di(meth)acrylate, dipropylene glycol di(meth)acrylate, and tripropylene glycol di(meth)acrylate.

12. The photopolymerizable composition of claim 1, wherein the metal oxide particles comprise a metal element selected from the group consisting of Zn, Zr, Ti, Hf and Ce.

13. The photopolymerizable composition of claim 1, wherein a D50 particle size of the metal oxide particles is 5 nm to 100 nm.

14. The photopolymerizable composition of claim 1, which comprises
   5% by weight to 85% by weight of the olefinic monomer;
   10% by weight to 70% by weight of metal oxide particles;
   0.1% by weight to 30% by weight of a dispersant; and
   0.1% by weight to 30% by weight of a photopolymerization initiator,
   based on 100% by weight of the total content of the photopolymerizable composition.

15. The photopolymerizable composition of claim 1, wherein the dispersant is at least one selected from the group consisting of acryl-based, epoxy-based and silicone-based compounds.

16. The photopolymerizable composition of claim 1, wherein the photopolymerization initiator is at least one selected from the group consisting of triazine-based, benzoin-based, benzophenone-based, imidazole-based, xanthone-based, oxime ester-based and acetophenone-based compounds.

17. The photopolymerizable composition of claim 1, which further comprises any one or more additives selected from the group consisting of 0.1 parts by weight to 30 parts by weight of a melamine crosslinking agent, or 0.1 parts by weight to 30 parts by weight of a silane coupling agent, based on 100 parts by weight of the photopolymerizable composition.

18. A cured film comprising a cured product of the photopolymerizable composition of claim 1.

19. A photopolymerizable composition comprising:
   one or more olefinic monomers;
   metal oxide particles;
   a dispersant; and
   a photopolymerization initiator,
   wherein the olefinic monomer comprises one or more olefinic monomers having an absolute viscosity measured at 25° C. of 1 cP to 30 cP,
   wherein the olefinic monomer comprises a glycol di(meth)acrylate monomer having an absolute viscosity measured at 25° C. of 11 cP to 30 cP, and
   wherein the dispersant is at least one selected from the group consisting of acryl-based, epoxy-based, and silicone-based compounds.

20. A cured film comprising a cured product of the photopolymerizable composition of claim 19.

\* \* \* \* \*